United States Patent
Yun et al.

(10) Patent No.: US 7,057,187 B1
(45) Date of Patent: Jun. 6, 2006

(54) SCINTILLATOR OPTICAL SYSTEM AND METHOD OF MANUFACTURE

(75) Inventors: Wenbing Yun, Walnut Creek, CA (US); Yuxin Wang, Arlington Heights, IL (US); David R. Trapp, Tracy, CA (US)

(73) Assignee: Xradia, Inc., Concord, CA (US)

( * ) Notice: Subject to any disclaimer, the term of this patent is extended or adjusted under 35 U.S.C. 154(b) by 41 days.

(21) Appl. No.: 10/704,382

(22) Filed: Nov. 7, 2003

(51) Int. Cl.
*G01J 1/58* (2006.01)

(52) U.S. Cl. ................................. 250/483.1

(58) Field of Classification Search ........... 250/370.09, 250/370.11, 483.1
See application file for complete search history.

(56) References Cited

U.S. PATENT DOCUMENTS 5,717,207 A * 2/1998 Koguchi et al. ............ 250/311
6,528,796 B1 * 3/2003 Kaifu et al. ............ 250/370.11
6,717,174 B1 * 4/2004 Karellas ..................... 250/582

* cited by examiner

*Primary Examiner*—David Porta
*Assistant Examiner*—Marcus Taningco
(74) *Attorney, Agent, or Firm*—Houston Eliseeva LLP

(57) ABSTRACT

A scintillated CCD detector system for imaging x rays uses x-rays having a photon energy in the range of 1 to 20 keV. The detector differs from existing systems in that it provides extremely high resolution of better than a micrometer, and high detection quantum efficiency of up to 95%. The design of this detector also allows it to function as an energy filter to remove high-energy x-rays. This detector is useful in a wide range of applications including x-ray imaging, spectroscopy, and diffraction. The scintillator optical system has scintillator material with a lens system for collecting the light that is generated in the scintillator material. A substrate is used for spacing the scintillator material from the lens system.

34 Claims, 3 Drawing Sheets

SCINTILLATOR OPTICAL SYSTEM AND METHOD OF MANUFACTURE

BACKGROUND OF THE INVENTION

X-ray imaging plays an important role in daily life. Imaging-type x-ray detectors are essential for applications ranging from medical x rays to astronomy to airport security.

Generally, imaging-type detectors for x-ray applications use either chemical detectors (e.g., film or photoresist) or electronic detectors (e.g., charge-coupled device array (CCD) or imaging plate). Their characteristics are described below Chemical-based detectors are the traditional x-ray imaging detectors. Films were first used by Röntgen to record x-ray exposures and continue to play a dominate role in medical imaging. The photoresist detectors provide extremely high imaging resolution and are used routinely in lithography applications.

The chemical detectors, however, suffer from the properties that they are single-use only and require post-exposure chemical processing to reveal or develop the image.

X-ray film detectors are widely used in medical imaging. Like photographic films, they use light-sensitive silver-halides to record the x-ray exposure and subsequent chemical development is used to reveal the latent image. The resolution of these photographic films is limited by the grain size to about 10 micrometers ($\mu$m). High-sensitivity films have coarser grains of 50–100 $\mu$m. The quantum detection efficiency of film is generally less than 5%.

Photoresists are typically thin sheets of an organic polymer. In the case of positive resists, the molecular bonds in the polymer are broken by the x-ray exposure, and the broken chains are removed by chemical development. This reveals the latent image. In the case of negative resists, the radiation exposure renders the polymer insoluble. The photoresists typically have extremely high resolution of a few nanometers, resolution being limited primarily by secondary electron exposure.

Most electronic imaging detectors are based on a CCD camera or an imaging plate. They overcome many problems associated with chemical detectors including the single-use and the requirement for post-exposure processing. Images recorded by an electronic detector can be read-out immediately after exposure.

These electronic imaging detectors, however, can suffer from radiation damage to the gate circuits. But if the radiation damage can be controlled, the detectors they typically have long service lifetimes. Imaging plates are generally used for large area and coarse resolution imaging applications.

With direct imaging CCD detectors, the CCD chip is exposed directly by the radiation to create electron-hole pairs. This system typically has very high conversion efficiency since no secondary magnification is used. There is also no loss of sampling rate due to re-sampling at a secondary magnification stage. The Nyquist-limited spatial resolution of the direct detection method is twice the pixel size. Since the pixel sizes of most CCD chips are typically 6–20 $\mu$m, the detection resolution is limited to about 10 $\mu$m. The number of electron-hole pairs created by an absorbed photon is approximately the photon energy divided by the gap energy. Hence, a hard x-ray photon with tens of kilo-electron-Volts (keV) energy can create thousands of electron-hole pairs. Since the full-well capacity of a CCD pixel is typically between 10,000 to 100,000 electrons. The dynamic range is therefore limited to about 100 for hard x rays. X-ray radiation can also damage the CCD chip, reducing the lifetime to less than 10,000 exposures.

Another configuration uses scintillated detectors with fiber-optic taper coupling. With this system, a fiber optic taper is typically bonded to the CCD chip on one side and coated with scintillation material on the other side. The system provides moderate magnification, commonly less than 10 times, with a few micrometer resolutions. The conversion efficiency is usually quite high, typically 70–80%. Radiation can be prevented from reaching the CCD directly, and thus the CCD does not suffer from radiation damage. These systems, however, suffer from distortion from the taper, which increases with the magnification.

Scintillated detector systems with photographic lens coupling use a scintillator screen to convert the x-ray photons into visible light photons. The image formed on the screen is then imaged to the CCD chip with a photographic lens. The conversion efficiency of these systems is not very high, however, since the numerical apertures of photographic lenses are generally low. Further, the resolution is typically lower than five micrometers. On the other hand, imaging performance is typically good due to the generally high imaging quality of commercial photographic lenses, and a large array of photographic lenses are commercially available to provide wide range of magnification and resolution capabilities.

Scintillated detectors with microscope objective lens provide the highest resolution, being better than a micrometer in the best cases. Among the electronic detector systems, they provide the highest resolution due to the use of the microscope objective. And because of the high resolution, only grainless single crystals are suitable scintillator material.

Moreover, the throughput can be very high with the use of high-numerical aperture objectives. These systems also have the smallest field of view due to the limitations of the objective. As in the case of photographic lenses, a large array of objectives with various magnification and numerical apertures are also commercially available to provide wide range of magnification and resolution capabilities.

SUMMARY OF THE INVENTION

The present invention concerns a scintillated CCD detector system for imaging x rays. It preferably uses x-rays have a photon energy in the range of 1 to 100 keV. The detector differs from existing systems in that it provides the possibility of extremely high resolution, of better than a micrometer, and high detection quantum efficiency, of up to 95%. The design of this detector also allows it to function as an energy filter to remove high-energy x-rays. This detector is useful in a wide range of applications including x-ray imaging, spectroscopy, and diffraction.

In general, according to one aspect, the invention features a scintillator optical system. This system comprises scintillator material. Specifically, this is material that, in response to radiation, emits light, typically in the optical frequencies or wavelengths.

The scintillator system further includes a lens system for collecting the light that is generated in the scintillator material. Further, a substrate is used for spacing the scintillator material from the lens system.

In the preferred embodiment, the diffractive index of the substrate is matched preferably to both the lens system and the scintillator material. In the preferred embodiment, the diffractive index of the substrate is within 30% of the refractive index of the lens system and/or the scintillator material. In the current embodiment, the index of the substrate is within 10% of the refractive index of both the lens system and the scintillator material. Often, the refractive index of the scintillator material and the substrate is between approximately 1.4 and 2.2.

In the preferred embodiment, the scintillator material is a crystalline material. Specifically, it is a single crystal. The use of single crystal scintillator material assures that there is no resolution loss due to the grain size as sometimes occurs with powdered scintillator materials, which are more commonly used.

In the preferred embodiment, the scintillator material is thallium-doped cesium iodide (CsI:Th). Further, the scintillator material is preferably thin, such as less than 50 micrometers thick.

In the preferred embodiment, because a thin crystalline scintillator material is used, the scintillator material is bonded to a substrate. This substrate provides mechanical rigidity to the scintillator material ensuring that it does not break.

In the preferred embodiment, the thickness of the substrate is set based on the working distance of the lens system. As a result, the substrate is used to precisely control the spacing between the scintillator material and the lens system ensuring stable alignment, focusing, and positioning of the scintillator material relative to the lens system.

In the preferred embodiment, the lens system comprises an objective lens and a tube lens. The objective lens typically has its focal point set at infinity. This has advantages in that by changing the tube lens, the magnification of the lens system can be changed without any other changes to the objective lens. A system using finite tube length objectives (one that images the object directly to a finite-conjugate image plane without the use of a tube lens) is also possible. Such a system can have slightly higher throughput because the tube lens is not needed, but focusing this systems requires moving the objective lens.

In general, according to another aspect, the invention features a scintillator optical system. This comprises scintillator material for producing light from X-rays. The scintillator material has a thickness in the direction of the optical axis that is set to preferentially convert lower energy X-rays into visible light. Because of the scintillator material's thickness, the higher energy X-rays are transmitted entirely through the scintillator material. As a result, the thin scintillator material functions as a low pass filter with respect to the radiation. That is, the system, and specifically a detector that detects the light from the scintillator is less responsive to the higher energy X-rays that are transmitted through the scintillator without being absorbed and converted into light.

In general, according to another aspect, the invention features a scintillator optical system. This system comprises scintillator material for producing light from X-rays. The scintillator material is doped to a depth in the direction of the optical axis, such that it converts X-rays only of a desired or lower energy into light. Typically, the doping depth is controlled, such that higher energy, undesired radiation, such as Bremstralung radiation, is transmitted entirely through the scintillator, without being converted to light. As a result, the detector and consequently the X-ray microscope, is not responsive to these higher energy X-rays. As a result, the system functions as a low pass filter, so that it is not responsive to this higher frequency, higher energy radiation.

In general, according to still another aspect, the invention features a method for fabricating a scintillator. This method comprises bonding scintillator material to a substrate. The scintillator material is then polished to a desired thickness.

Generally, the scintillator material is polished to a thickness of less than 50 micrometers. In the preferred embodiment, the scintillator material is polished to a thickness of less than 15 micrometers.

The scintillator material is currently cesium iodide doped with thallium.

In the preferred embodiment, the sidewalls of the scintillator material are beveled prior to the polishing step. This facilitates the polishing process and specifically prevents scratching or other damage to the scintillator material during the polishing process.

In general, according to another aspect, the invention features an X-ray microscope optical system. This optical system comprises an X-ray radiation train. This train includes a zone plate lens for imaging radiation from a sample and a scintillator for converting the radiation to light. An optical train is further provided, including a detector and an objective for imaging light from the scintillator onto the detector. The X-ray radiation is generated by an electron bombardment source. This radiation is used efficiently by the combination of the X-ray radiation train and the optical train.

One of the primary advantages of the present system is its compact size. The electron bombardment source is small, much less expensive, and allows constant access, compared with synchrotron x-ray sources, which are more commonly used for high-resolution x-ray microscopy. A combination of the X-ray radiation train and the optical train ensures that the total size of the X-ray and the optical frequency optics have a size appropriate for laboratory use. For example, if an entirely X-ray optical train is used, with the zone plate lens, the system can meters long, due to the long focal lengths that are common with zone plate lenses.

In the preferred embodiment, both the X-ray radiation train and the optical train provide magnification. The magnification of the X-ray train is preferably between 1 and 100. The magnification of the optical train is preferably between 10 and 80. In the preferred embodiment, the X-ray train's magnification is between 20 and 50, and preferably 30. The magnification of the optical train is between 10 and 40, and preferably 20. The combination of these magnifications enables the overall system to achieve magnifications of 500 to 1,000 times. This allows for nanometer level resolution for common CCD pixel sizes, which are on the order of 5 to 20 micrometers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
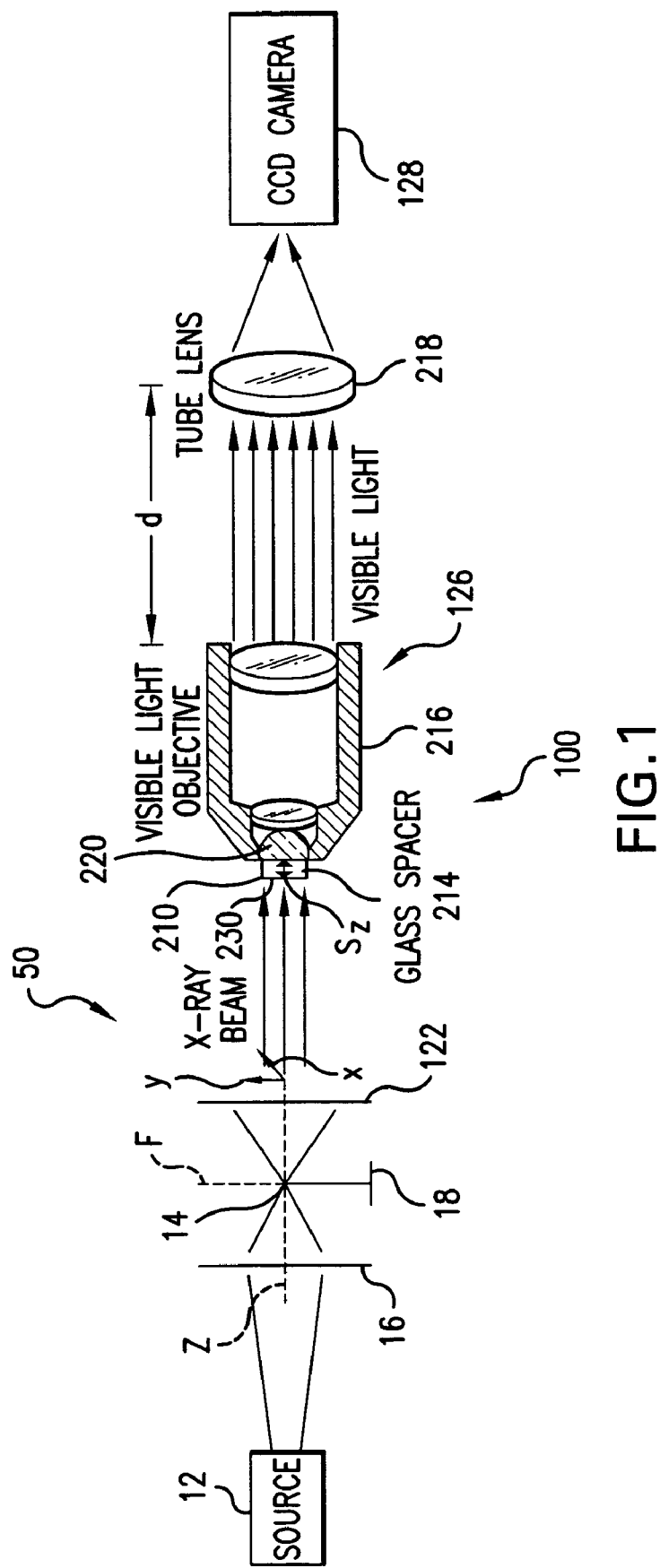
FIG. 1 is a schematic plan, cross-sectional view of an X-ray microscopy optical system including a scintillator optical system according to the present invention.

FIG. 1 shows an X-ray microscope, including a scintillator optical system 100, which have been constructed according to the principles of the present invention.

Specifically, a sample 14 is located at the system's focal plane f. It is illuminated preferably by hard x rays in 1–20 kilo-electron-Volts (keV) photon energy range. These x-rays are generated by a source 12 and possibly concentrated by a concentrator or capillary tube condenser 16.

In the preferred embodiment, the sample 14 is held on a stage that allows for positioning along the optical axis z, and also positioning in the x-axis direction and the y-axis direction, which are orthogonal to the z optical axis. The diverging x-rays from the sample 14 are collected by an X-ray optic. Preferably, a zone plate lens 122 is used. This focuses the radiation onto scintillator material 210.

The scintillator material 210 converts x-ray radiation into visible-light photons by either phosphorescence (forbidden decay transitions) or luminescence (allowed orbital decay transition) processes. When the incoming x-ray photons are of a few keV in energy, the amount of visible-light photons created per x-ray photon absorbed is approximately the ratio of the x-ray photon energy and the visible light photon energy.

Most commonly used scintillator materials are phosphors, such as those used in cathode ray tubes and fluorescent light bulbs. They typically work by a phosphorescence process with long decay times and very high conversion efficiency. They tend to have coarse grain size of a few micrometers or larger and therefore not suitable for imaging application with resolution of a micrometer or better. The long decay time of phosphorescence process may also make them unsuitable for high-speed applications.

In the preferred embodiment, single crystal scintillator material is used, such as thallium-doped cesium iodide (CsI:Th) and $CdWO_4$ to overcome both problems. LSO is another alternative. The monolithic crystal is polished to an optically flat surface that is free from grain structures or defects. The intrinsic resolution is thereby limited to about 10–100 nanometers (nm) by secondary electrons for x-rays with 1–20 keV energy. These scintillators produce the emission in a luminescence process with typical decay time of $10^{-12}$–$10^{-9}$ second. Their conversion efficiency is generally lower than the phosphor grains.

Preferably, the cesium iodide is doped to approximately 0.2% thulium.

The generated light is collected by an optical system 126 that is part of the scintillator optical system 100. Specifically, the optical system 126 comprises a microscope objective 216. Preferably, this is a commercially available immersion-type microscope objective. It has a defined working distance, which is the distance between the front of the lens 220 and the object. In this case, the object is the scintillator material 210. The microscope objective 216 images this light at infinity, in the current implementation. As a result, in the current implementation, a tube lens system 218 is used to image the light onto the detector 128.

The resolution and the collection efficiency of the scintillator optical system 100, including the scintillator material 210/optical system 126 primarily depends on the numerical aperture (NA) of the microscope objective lens 216. The resolution of an objective is related to the NA by $0.61 \times \lambda$/NA. Objectives with high NA are able to collect the light emitted from the scintillator material 210 from a wider angular range but from a thinner depth because of the smaller depth of field.

It is therefore important to optimize the achievable resolution and overall collection efficiency of the scintillator optical system 100. It has been found that a numerical aperture of about between 0.65 to 0.85 or about 0.75 is ideal for achieving sub-micrometer resolution at optimized collection efficiency for 5.4 keV x-rays with a CsI scintillator.

Most modern objectives use the infinity-corrected design, in which the object is placed at the front focal plane of the objective and imaged to infinity. A point on the object therefore forms parallel rays after being imaged by the objective lens. A real image is then formed by the tube lens system 218, which focuses the parallel rays to the detector (such as CCD or film) or eye piece. In this design, the magnification of the compound objective-tube lens optical system 126 is the ratio of the focal length of the tube lens $f_t$, and the objective $f_o$: $M=f_t/f_o$.

The magnification is independent from the distance d between the objective 216 and the tube lens 218. Vignetting may occur if the two lenses are placed too far, but the magnification will remain the same. In the present design, the scintillator material 210 is mounted directly on the objective 216 without the ability to focus; the tube lens 218 is used for focus adjustment.

The magnification of the optical system 126 can be modified by either changing the focal length of the objective 216 or the tube lens 218. It is convenient to design and fabricate spacer substrate 214 from glass or other index-matching material such as sapphire (n=1.8) for a single objective and use tube lenses of various focal lengths to achieve different magnification. Either a set of fixed focal length lenses or a zoom lens is usually used as the tube lens 218.

Varying the tube lens to achieve different magnification has a number advantages compared with using different objective lenses: (1) the objective lens 216, which has more position sensitivity does not need to move and can be mounted with a solid fixed mount, while the tube lens 218 does not require high precision; (2) the glass spacer 214 and scintillator assembly design and fabrication process is complex and requires high precision; (3) photographic lenses are ideal as tube lenses because they are commercially available in many configurations with high imaging quality and low cost, while in comparison, objective lenses 216 are usually very costly.

According to the invention, the scintillator material 210 is attached to and preferably bonded to the substrate 214. The thickness of this substrate $S_Z$ is preferably set in response to the working distance of the objective lens 216. The use of this substrate 214 ensures that the distance between the scintillator material 210 and the objective lens system 216 is highly stable.

The immersion-type-objective lens 216 is used instead of an air-gap lens. The immersion lens system requires that the space between the object and the front surface of the lens be filled with a medium with index of refraction typically between 1.2–1.8, depending on the lens design. Since the NA of a lens is defined as n/sin(θ), where θ is the lens collection half angle, the use of immersion medium allows very high NA lenses to be made. Furthermore, since the scintillators typically have an index of refraction of 1.3–2.0, the use of immersion medium allows better index-matching between the scintillator material 210 and the lens and reduces phase distortion during the propagation across the medium boundary.

The most commonly used immersion medium is mineral oil with index of refraction of 1.4. Instead of using oil, however, the substrate 214 is selected or fabricated with a thickness equal to the lens' designed working distance and an index of refraction of 1.4.

The use of a glass spacer substrate 214 has a number benefits: (1) it functions as a polishing substrate on which the scintillator crystals are mounted to perform the polishing procedures; (2) it mounts the scintillator material 210 on the lens securely, so that no adjustments are needed in the future.

In the preferred embodiment, to increase the efficiency of the scintillator optical system, the front surface 230 of the scintillator material 210 is coated with a material that reflects the light generated in the scintillator material 210, by the X-ray radiation. In one embodiment, this reflective material 230 is a multi-layer thin film filter. In another embodiment, a thin metal coating 230 is used, such as aluminum and titanium.

In the preferred embodiment, the thickness $X_z$ of the scintillator material 210, in the direction of the optical axis z, is selected to optimize the sensitivity of the scintillator system 100 to desired wavelengths of the X-ray radiation.

Generally, the thickness of the crystal scintillator can be controlled to optimize the sensitivity to x rays of different energy. Except for near absorption edges, low energy x rays tend to be absorbed in a very thin front surface layers of the scintillator and high energy x rays will penetrate deeper into the scintillator. A high energy x-ray photon also generates more visible light photons than a low energy x-ray photon. By making a scintillator thin, the sensitivity to high energy photons is reduced because of the lowered absorption in the small volume. On the other hand, high-energy photons will produce stronger signals in a thick scintillator. Therefore, the scintillator can function as an energy filter and its thickness can be adjusted to filter the desired x-ray energies.

Figure 2:
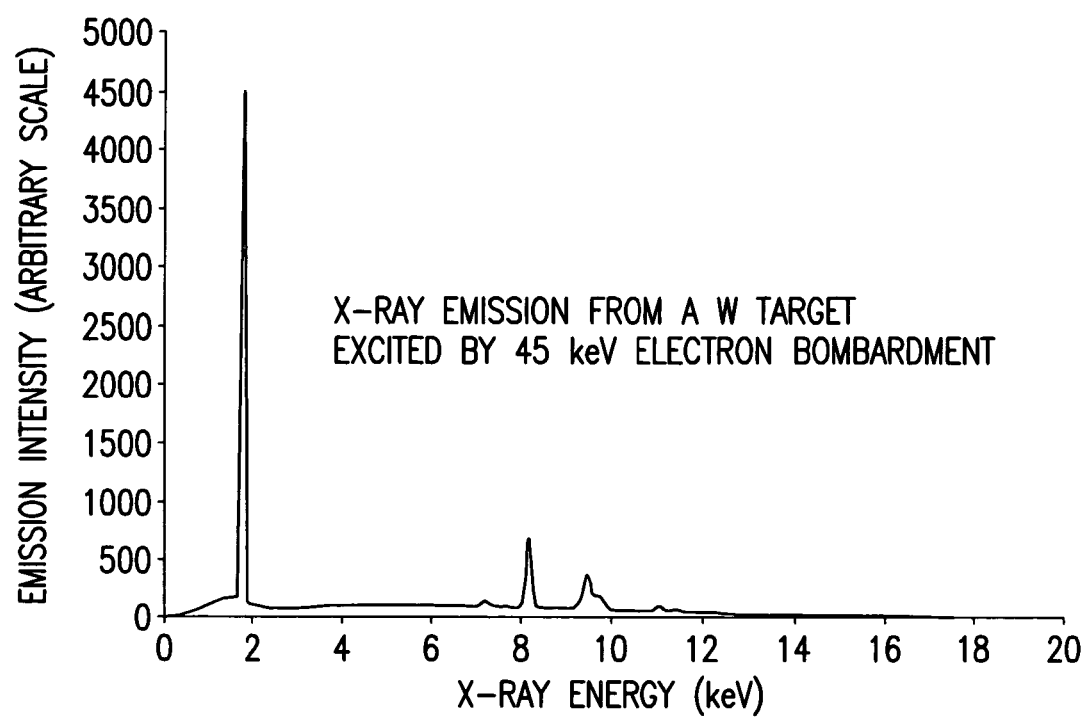
FIG. 2 is a spectral plot of the radiation emitted from an electron bombardment source with a tungsten target excited by a 45 keV electron source.

Specifically, FIG. 2 is a schematic plot showing the radiation emitted by an electron bombardment laboratory X-ray source. Typically, a large portion of the X-rays are generated at the characteristic emission lines of the target material. Nonetheless, however, there is a certain amount of background Bremstralung radiation. This is generated by the inelastic collisions within the target material. The thickness of the scintillator material is selected such that the higher frequency, shorter wavelength, X-ray radiation above the desired radiation characteristic line, are not efficiently converted to the optical wavelengths. As a result, the scintillator system functions as a low pass filter. This is because the shorter wavelength radiation is more penetrating and therefore, passes through the thin scintillator material 210.

Preferably, the scintillator material 210 thickness is sized such that only about 10% of the radiation above the characteristic line is converted into light. Preferably, in the preferred embodiment, the scintillator material is less than 100 micrometers in thickness ($S_z$) and preferably less than 50 micrometers in thickness. Currently, it is less than 10 micrometers thick in the direction of the optical axis z.

In the preferred embodiment, the substrate 214 is index matched to the scintillator material 210 and the specifications of the objective lens system 126. Specifically, the refractive index of the substrate is preferably within 30% of the refractive index of the objective lens system 216. Preferably, the refractive index is within 10% of the lens system. Moreover, to improve the apparent depth of focus and the efficiency with which radiation is collected from the scintillator material, the substrate 214 is also index matched to the scintillator material 210 to within 30%, and preferable within 10%. Index matching between the substrate and the scintillator material ensures that a small solid angle in the light exiting the scintillator material 210 into the substrate 214, thereby increasing the efficiency with which the radiation is collected. This yields a higher resolution and a higher collection efficiency.

In an alternative embodiment, the thallium is doped into one surface of the bulk material of the scintillator such as CsI. The depth of the doping is controlled to yield a doping which corresponds to the desired thickness scintillator material thickness. As a result, the effective depth of the scintillator material is controlled by carefully controlling the doping depth.

Figure 3:
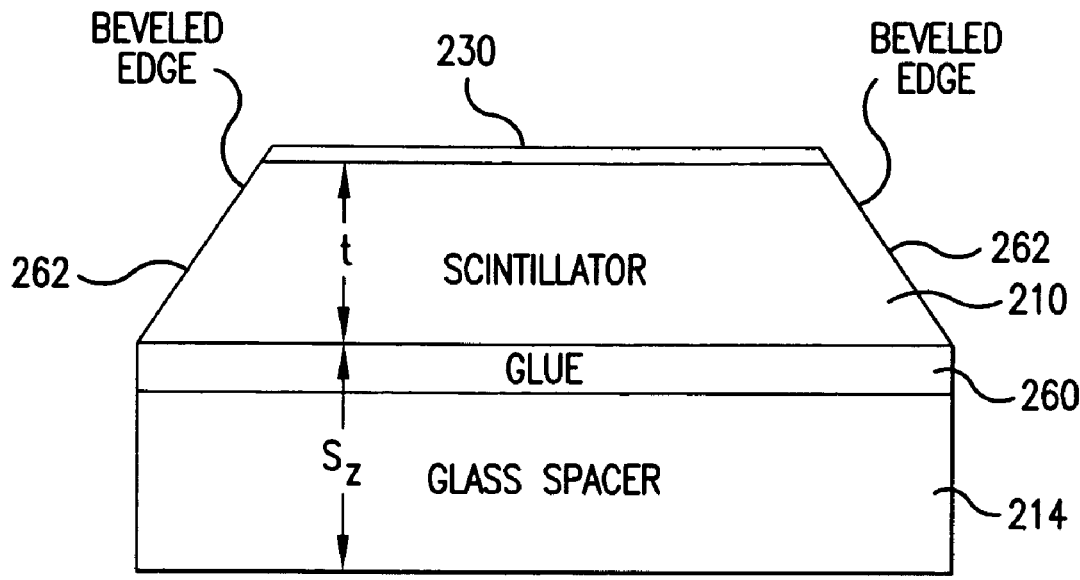
FIG. 3 is a side plan view of a scintillator material/glass substrate system for the inventive scintillator optical system.
Figure 4:
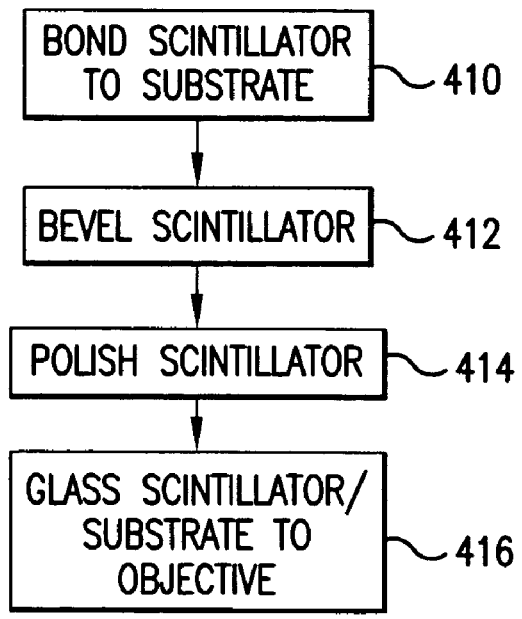
FIG. 4 is a flow diagram illustrating a method for fabricating the inventive scintillator material/glass substrate system.

FIG. 3 shows the scintillator material 210 bonded to the substrate 214 to form the scintillator material/substrate system. FIG. 4 illustrates a process for manufacturing the scintillator material/substrate system, according to the present invention.

Specifically, the scintillator material 210, such as thallium doped cesium oxide is bonded to the substrate 214 using a glue or epoxy layer 260 in step 410. This substrate and scintillator material are selected so that their refractive indexes are within 30% of each other. In the preferred embodiment, the refractive indexes are within 10% of each other.

The scintillator material typically, however, is usually commercially available in bulk form, which is too thick. For example, cesium iodide crystals are commercially available at 1 millimeter thicknesses. As a result, the sides of the scintillator material are then preferably beveled in step 412. Preferably, this angle is relatively shallow. Specifically, they are beveled at approximately 15°. Creating a beveled edge 262 before polishing is important to control the debris generated during the polishing process.

Then, the scintillator material 210 is applied to a rotating polishing wheel, i.e., it is lapped to approximately the required thickness, and then polished to an optically flat surface, in step 414. The scintillator material is polished down to the desired thickness. In the preferred embodiment, the thickness of the scintillator material is less than 100 micrometers thick. Preferably, the thickness t is less than 50 micrometers thick. In one instant embodiment, the scintillator material is less than 10 micrometers thick.

Preferably, once the scintillator material has been polished to the desired thickness, it is coated with the optically reflective material 230. This can be a quarter wave stack of dielectric coatings. In an alternative embodiment, a thin metal coating is applied. In any event, a coating is selected that is reflective to the optical frequencies generated in the scintillator material 210 by the X-ray radiation. The coating, however, is selected so that it is not absorbing, scattering, or reflective to the X-ray radiation so that there is no loss in efficiency. The coating: (1) blocks the visible light; and (2) increases the collection efficiency by reflecting the light that would otherwise be emitted to the outside of the scintillator. The use of metallic coating may reduce the resolution, however, in some cases.

A chemically and mechanically stable layer of acrylic, epoxy, or PMMA can also applied to the front surface to protect the scintillator. The scintillator-glass spacer substrate system is then glued to the microscope objective 216 to complete the fabrication process in step 416.

Returning to FIG. 1, in the preferred embodiment, a distributed X-ray magnification microscopy system is used. Specifically, the radiation optical train 50 is selected to have a magnification of between 10 and 100. Preferably, the magnification of the X-ray optical train 50 is between 20 and 50, or preferably, approximately 30.

The magnification of the optical train of the optical system 126 then is typically between 5 and 80. Specifically, the preferred range is between 10 and 40, specifically the optical train in the current embodiment, has a magnification of 20. As a result, the total magnification of the distributed magnification system is between 500 and 1,000. This allows the imaging of nanometer size structures in the sample onto the pixels of a common CCD device. These pixels are typically between 5 and 20 micrometers in size.

While this invention has been particularly shown and described with references to preferred embodiments thereof, it will be understood by those skilled in the art that various changes in form and details may be made therein without departing from the scope of the invention encompassed by the appended claims.

What is claimed is:

1. A scintillator optical system comprising:
   scintillator material;
   a lens system for collecting light generated in the scintillator material, wherein the lens system comprises an objective lens and a tube lens; and
   a substrate for spacing the scintillator material from the lens system.

2. A scintillator optical system as claimed in claim 1, wherein the scintillator material is crystalline.

3. A scintillator optical system as claimed in claim 1, wherein the scintillator material is thallium doped CsI or LSO.

4. A scintillator optical system as claimed in claim 1, wherein the scintillator material is less than 50 micrometers thick.

5. A scintillator optical system as claimed in claim 1, wherein the scintillator material is bonded to the substrate.

6. A scintillator optical system as claimed in claim 1, wherein the objective lens has a focal point set at infinity.

7. A scintillator optical system as claimed in claim 1, wherein the substrate thickness is set based on a working distance of the lens system.

8. A scintillator optical system as claimed in claim 1, the scintillator material having a thickness in direction of an optical axis selected to function as a low pass filter of the X-rays by only converting lower energy X-rays to the light.

9. A scintillator optical system as claimed in claim 8, wherein the scintillator material is crystalline.

10. A scintillator optical system as claimed in claim 8, wherein the scintillator material is thallium doped CsI or LSO.

11. A scintillator optical system as claimed in claim 8, wherein the scintillator material is less than 50 micrometers thick.

12. A scintillator optical system as claimed in claim 8, wherein the scintillator material is bonded to a substrate.

13. A scintillator optical system as claimed in claim 1, the scintillator material being doped to a depth in a direction of an optical axis selected to function as a low pass filter of the X-rays by only converting lower energy X-rays to the light.

14. A scintillator optical system as claimed in claim 13, wherein the scintillator material is crystalline.

15. A scintillator optical system as claimed in claim 13, wherein the scintillator material is thallium doped CsI or LSO.

16. A scintillator optical system as claimed in claim 13, wherein the scintillator material is less than 50 micrometers thick.

17. A scintillator optical system as claimed in claim 1, further comprising an x ray source for irradiating a sample and a zone plate for collecting the x rays from the sample and focusing the x rays onto the scintillator material.

18. A scintillator optical system, comprising:
    scintillator material;
    a lens system for collecting light generated in the scintillator material; and
    a substrate for spacing the scintillator material from the lens system, wherein the substrate thickness is set based on a working distance of the lens system.

19. A scintillator optical system as claimed in claim 18, further comprising an x ray source for irradiating a sample and a zone plate for collecting the x rays from the sample and focusing the x rays onto the scintillator material.

20. A scintillator optical system as claimed in claim 18, wherein the scintillator material is crystalline.

21. A scintillator optical system as claimed in claim 18, wherein the scintillator material is thallium doped CsI or LSO.

22. A scintillator optical system as claimed in claim 18, wherein the scintillator material is less than 50 micrometers thick.

23. A scintillator optical system as claimed in claim 18, wherein the scintillator material is bonded to the substrate.

24. A scintillator optical system as claimed in claim 18, wherein the lens system comprises an objective lens and a tube lens.

25. A scintillator optical system as claimed in claim 24, wherein the objective lens has a focal point set at infinity.

26. A scintillator optical system as claimed in claim 18, the scintillator material having a thickness in direction of an optical axis selected to function as a low pass filter of the X-rays by only converting lower energy X-rays to the light.

27. A scintillator optical system as claimed in claim 26, wherein the scintillator material is crystalline.

28. A scintillator optical system as claimed in claim 26, wherein the scintillator material is thallium doped CsI or LSO.

29. A scintillator optical system as claimed in claim 26, wherein the scintillator material is less than 50 micrometers thick.

30. A scintillator optical system as claimed in claim 26, wherein the scintillator material is bonded to the substrate.

31. A scintillator optical system as claimed in claim 18, the scintillator material being doped to a depth in a direction of an optical axis selected to function as a low pass filter of the X-rays by only converting lower energy X-rays to the light.

32. A scintillator optical system as claimed in claim 31, wherein the scintillator material is crystalline.

33. A scintillator optical system as claimed in claim 31, wherein the scintillator material is thallium doped CsI or LSO.

34. A scintillator optical system as claimed in claim 31, wherein the scintillator material is less than 50 micrometers thick.

* * * * *